Aug. 18, 1942.　　　J. H. ROONEY ET AL　　　2,293,174
MANUFACTUURE OF ARTIFICIAL MATERIALS
Original Filed Nov. 27, 1937

JAMES H. RODNEY
PHILIP R. HAWTIN
STEPHEN R. CHAPLIN
INVENTORS

ATTORNEYS

Patented Aug. 18, 1942

2,293,174

UNITED STATES PATENT OFFICE 2,293,174

MANUFACTURE OF ARTIFICIAL MATERIALS

James Henry Rooney and Philip Richard Hawtin, Spondon, near Derby, and Stephen Roy Chaplin, Leicester, England, assignors to Celanese Corporation of America, a corporation of Delaware Original application November 27, 1937, Serial No. 176,846. Divided and this application June 27, 1940, Serial No. 342,636. In Great Britain December 4, 1936

1 Claim. (Cl. 18—15)

This invention relates to the manufacture of films, foils and like products by the evaporative method, and provides apparatus for introducing colouring agents or other desired constituents into such products during their formation. This application is a division of our application S. No. 176,846, filed November 27, 1937.

The manufacture of films, foils and like products by the evaporative method is commonly carried out by extruding a suitable film-forming dope, for example a solution of cellulose acetate in acetone or other volatile solvent, on to a travelling support, e. g. an endless metal band or drum, and effecting evaporation of the bulk of the volatile solvent during the travel of the extruded material from the extrusion point to a point at which the product is stripped from the support. Coloured films or foils can be obtained either by introducing suitable colouring agents into the composition to be extruded or by subjecting the finished products to processes analogous to the dyeing of textile materials. Both these methods, however, present disadvantages. The first method does not enable the film-forming apparatus to be turned over quickly from the production of films of one colour to the production of films of another colour, and the second method introduces an extra and relatively slow operation. It is the primary object of the present invention to provide apparatus for obtaining coloured films, foils and like materials by the evaporative method which is free from these disadvantages.

According to the invention of application S. No. 176,846 referred to above, a colouring agent or other desired constituent of the product is introduced by applying a solution of said constituent to the partly dried layer of dope, preferably by flowing the liquid on to the surface thereof. The liquid should be adapted to spread over the surface of the product to the desired extent and should preferably be removed from said surface at least partly by evaporation, for example partly by evaporation and partly by absorption, during the travel of the product from the extrusion point to the point at which it is stripped from the supporting surface. Thus, coloured foils of cellulose acetate can readily be produced by extruding a solution of cellulose acetate in acetone on to an endless nickel band passing through a warm atmosphere and applying to the surface of the foil just beyond the extrusion point a solution of a suitable dye in a liquid consisting substantially of acetone, ethyl alcohol or a mixture of the two, and containing a plasticizer for cellulose acetate, for example dimethyl phthalate. The amount of colouring liquid applied is so regulated, having regard to the speed of travel of the band, the temperature of the evaporative atmosphere and the composition of the liquid, that the bulk of the volatile constituents such as acetone and alcohol is evaporated by the time the foil reaches the point at which it is stripped from the band. The plasticiser and a certain proportion of the volatile constituents are absorbed into the foil. Among suitable colouring agents are the basic dyes, e. g. methylene blue or malachite green, and water insoluble dyes of the kind used for dyeing cellulose acetate textile materials, e. g. 1-4 di(methylamino) anthraquinone, and 4-nitro-2 methoxy benzene azo dimethyl aniline. The proportion of plasticiser used should not be sufficiently great to have an adverse effect on the tenacity of the products. It is indeed not impossible to dispense with the plasticiser, but in that case it is less easy to obtain even colouration owing to the greater mobility of the colouring liquid.

A suitable medium for the introduction of the dye into a film or foil during the production by the evaporative method from a dope comprising cellulose acetate dissolved in acetone can be made by dissolving in a 40–60/60–40% mixture of acetone and alcohol 10–30% of its weight of dimethyl phthalate.

A suitable device for applying the colouring liquid comprises a reservoir for said liquid having an adjustable aperture, a wick or curtain of porous material for conveying the liquid from said reservoir to the surface of the film, said wick extending downwardly from the interior of said reservoir through said aperture, means for varying the size of said aperture so as to control the amount of liquid passing through said curtain to the product and means for micrometrically adjusting the height of the lower edge of said curtain above the surface of the product.

A preferred form of apparatus according to the invention is shown by way of example in the accompanying drawing wherein Fig. 1 represents diagrammatically the general layout of the apparatus;

Figure 1:
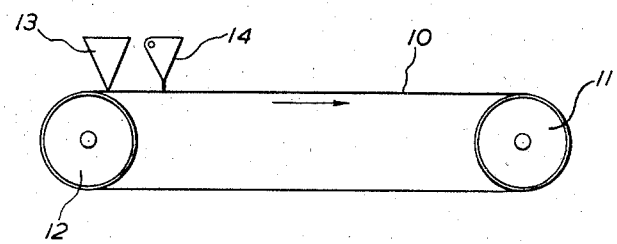

Referring to Fig. 1 the endless film-forming band 10 which is composed of nickel or other suitable material is driven by means of the drum 11 and passes round the idler drum 12. The band passes in turn the extrusion device 13 from which a film-forming solution is extruded on to the band, and the liquid-supplying device 14 by means of which the colouring or other desired treating liquid is applied to the freshly extruded film. Heating elements (not shown) are provided for warming the atmosphere through which the film-forming band passes. Stripping means, also not shown, are provided for removing the dried film from the band.

Figure 2:
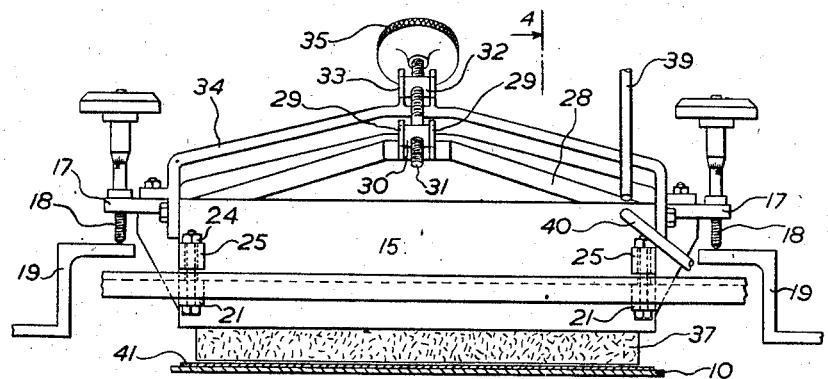
Fig. 2 is a detail view in elevation of the liquid-supplying apparatus seen from behind.
Figure 3:
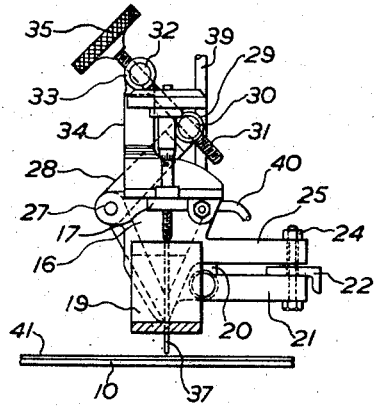
Fig. 3 is a detail view in elevation of the liquid-supplying apparatus, seen from one side of the film-forming band.
Figure 4:
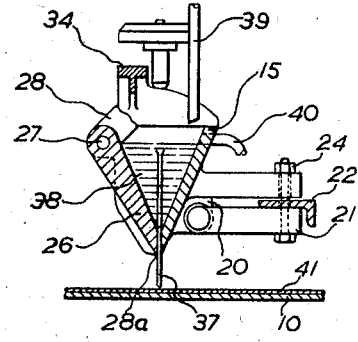
Fig. 4 is a part sectional elevation taken along the line 4—4 of Fig. 2.

Referring now to Figs. 2, 3 and 4, the trough 14 is of V-shaped section and has a fixed side 15 and fixed ends 16 carried by brackets 17 which in turn are carried by micrometer screws 18 resting upon fixed brackets 19.

The fixed side 15 is provided near each end with a lug 20 on which is pivotally mounted a rod 21 which engages the underside of the fixed rail 22 and is supported by the bolt 24 depending from the lug 25, the whole forming a flexible mounting which prevents rocking of the trough about the micrometer screws 18.

The other side 26 of the trough is pivotally mounted on a bolt 27 running through the fixed end members of the trough. An extension 28 of the side 26 is adapted to function as a crank to move the side about its pivot 27, so varying the size of the aperture 28a between the two sides of the trough. Between a pair of lugs 29 on the extension 28 is pivotally mounted a nut 30. A differential screw 31 runs through this nut and through a nut 32 pivotally mounted on lugs 33 forming part of a bridge-piece 34 which is bolted to the end members of the trough. Thus, by turning the knurled head 35 of the micrometer screw 31 the size of the aperture 28a can be adjusted within fine limits.

A liquid distributing curtain 37 comprising a foraminous base wound round with layers of flannel or other suitable absorbent material is clamped by means of the micrometer screw 31 between the fixed and movable sides of the trough so as to fill the space 28a. This curtain extends downwardly towards the film-forming band and upwardly into the trough, so allowing the liquid 38 within the trough to flow slowly towards the film-forming band 10. Liquid is supplied to the trough by the drip pipe 39 and an overflow pipe 40 is provided.

In operation, the micrometer screws 18 are first adjusted to bring the curtain 37 into contact with the freshly extruded layer of film 41 and the adjustment is then altered very slightly so as to bring the curtain itself but not the stream of liquid oozing therefrom out of contact with the layer of film.

When it is desired to produce uniformly coloured films, the wick or curtain should extend across the whole surface of the band. The invention is not, however, limited to the production of uniformly coloured films. Local colouration can be effected by suitable adaptations of the apparatus. Thus, for example, two or more devices of the kind described, each extending over a part only of the width of the foil, can be employed. These may be in line or in staggered relationship.

As indicated above the process and apparatus of the invention can be used for other purposes besides the application of colouring agents to films, foils and like products, for example to apply effect materials and/or to introduce plasticisers and non-inflammators.

The invention has been described with particular reference to the manufacture of foils of cellulose acetate since this is one of its most important applications. The apparatus of the invention is, however, quite generally applicable to the production of films, foils, ribbons and like materials by the evaporative method, and particularly to the production of such materials from compositions comprising derivatives of cellulose, for example organic esters such as cellulose formate, butyrate and propionate, esters containing inorganic acidyl radicles such as cellulose ultrate, cellulose nitroacetate, cellulose nitrate acetate propionate, ethers such as methyl, ethyl and benzyl cellulose and ether-esters such as ethyl cellulose acetate and oxy-ethyl cellulose acetate.

Having described our invention, what we desire to secure by Letters Patent is:

A device for use in introducing coloring agents or other desired constituents into films, foils and like products during their production by the evaporation of a volatile solvent from a layer of dope on a travelling support, said device comprising a reservoir for a liquid containing a coloring agent or other constituent, said reservoir including a trough having fixed ends, a fixed inclined side and a side pivotally mounted so that its lower edge can swing towards or away from the lower edge of the fixed side, a wick clamped between the lower edges of the two sides so as to close the aperture formed by said two sides, means embodying a micrometer screw for adjusting the position of the pivotally mounted side to control the amount of liquid passing through said wick and means for micrometrically adjusting the height of the lower edge of said wick above the surface of the product.

JAMES HENRY ROONEY.
PHILIP RICHARD HAWTIN.
STEPHEN ROY CHAPLIN.